(12) United States Patent
Elfindale

(10) Patent No.: US 9,913,453 B2
(45) Date of Patent: Mar. 13, 2018

(54) PET SANITATION DEVICE

(71) Applicant: Aquilla Elfindale, Muncie, IN (US)

(72) Inventor: Aquilla Elfindale, Muncie, IN (US)

( * ) Notice: Subject to any disclaimer, the term of this patent is extended or adjusted under 35 U.S.C. 154(b) by 128 days.

(21) Appl. No.: 14/827,498

(22) Filed: Aug. 17, 2015

(65) Prior Publication Data

US 2016/0044888 A1 Feb. 18, 2016

Related U.S. Application Data

(60) Provisional application No. 62/037,772, filed on Aug. 15, 2014.

(51) Int. Cl.
*A01K 1/01* (2006.01)

(52) U.S. Cl.
CPC .................... *A01K 1/011* (2013.01)

(58) Field of Classification Search
CPC ........ A01K 1/01; A01K 1/0107; A01K 1/011; A01K 1/0114; A01K 1/0128; A01K 1/0132; A01K 1/0152
USPC .............. 119/161, 165, 166, 163; 366/168.1, 366/172.2, 205, 314
See application file for complete search history.

(56) References Cited

U.S. PATENT DOCUMENTS

| | | | | |
|---|---|---|---|---|
| 3,963,220 A * | 6/1976 | Ohchi | ...................... | A21C 1/02 366/307 |
| 4,941,750 A * | 7/1990 | Bouchez | ............. | B01F 7/00275 366/147 |
| 5,048,465 A * | 9/1991 | Carlisi | ................... | A01K 1/011 119/161 |
| 5,662,066 A * | 9/1997 | Reitz | .................... | A01K 1/0114 119/163 |
| 5,996,533 A * | 12/1999 | Gordon | ................ | A01K 1/0114 119/166 |
| 6,532,900 B1 * | 3/2003 | Wang | ..................... | A01K 1/011 119/458 |
| 6,568,348 B1 * | 5/2003 | Bedard | ................ | A01K 1/0114 119/166 |
| 6,701,868 B1 * | 3/2004 | Shepherd | ............. | A01K 1/0114 119/161 |
| 2007/0125309 A1 * | 6/2007 | Gordon | .................. | A01K 1/011 119/166 |

(Continued)

FOREIGN PATENT DOCUMENTS

| | | | | |
|---|---|---|---|---|
| FR | 2630295 A1 * | 10/1989 | ............. | A01K 1/011 |
| WO | WO 9957967 A1 * | 11/1999 | ............. | A01K 1/011 |

OTHER PUBLICATIONS

English-language translation of FR 2630295.*

(Continued)

*Primary Examiner* — Lisa L Tsang
(74) *Attorney, Agent, or Firm* — Woodard Emhardt Moriarty McNett & Henry LLP

(57) ABSTRACT

A pet sanitation device provides a litter-containing basket in a housing. After a pet uses the device, the housing and basket are filled with water to dissolve waste in the litter, thus producing wastewater. The basket is then caused to spin about a central axis in the housing, and the spinning motion produces centrifugal forces that force the wastewater outward from the basket and into the space between the basket and the housing. The wastewater is drained from the housing, leaving the device ready for a subsequent use.

5 Claims, 3 Drawing Sheets

(56) References Cited

U.S. PATENT DOCUMENTS

2007/0227457 A1* 10/2007 Waters ............... A01K 1/0114
119/166

OTHER PUBLICATIONS

"Julia Child the French Chef—Salade Nicoise," available at https://www.youtube.com/watch?v=InwORE68dgc (see around 11:10 min mark to around 12:30 min mark) (Year: 2013).*

* cited by examiner

PET SANITATION DEVICE

CROSS-REFERENCE TO RELATED APPLICATIONS

This application claims the benefit of U.S. Provisional Patent Application Ser. No. 62/037,772, filed Aug. 15, 2014, the entire contents of which are hereby incorporated herein by reference.

BACKGROUND TO THE INVENTION

Litter boxes are commonly used where pets are kept indoors, and allow pets to urinate and/or defecate without soiling the room. The pet owner then scoops the waste from the box and disposes of it appropriately. Clumping litters are used to allow both solid and liquid waste to be disposed of in this manner.

Many pet owners would prefer not to have to scoop a litter box. Accordingly, devices that scoop the box automatically have been developed and provide a benefit to many pet owners. For example, the ScoopFree® Self-Cleaning Litter Box rakes the litter automatically and pushes the waste to a container that can easily be removed. Similarly, the Hagen Catlt SmartSift Litter Box uses a sifter controlled by a lever to sift through the litter. Clean litter falls through sifter, while waste clumps are deposited into a waste bin below.

The CatGenie 120 Cat litter box uses washable litter granules instead of disposable litter. The granules are contained in the litter box, where a rake separates and scoops solids into a hopper. Solid wastes are treated with a solution that liquefies them, and liquid waste drains through the granules to a reservoir. The liquid waste and liquefied solids are then flushed away.

The devices presently known to the art do not satisfactorily remove all waste without substantial effort. A need therefore exists for a device that is more automatic and effective. The present invention addresses that need.

SUMMARY OF THE INVENTION

One aspect of the present invention is a pet sanitation device comprising a litter-containing basket in a housing. After a pet uses the device, the housing and basket are filled with water to dissolve waste in the litter, thus producing wastewater. The basket is then caused to spin about a central axis in the housing, and the spinning motion produces centrifugal forces that force the wastewater outward from the basket and into the space between the basket and the housing. The wastewater is drained from the housing, leaving the device ready for a subsequent use.

In one preferred embodiment the device comprises:
a) an outer housing comprising a water-retaining sidewall and a water-retaining floor and a drain effective to drain water from the housing;
b) an inner basket positioned within the outer housing and spaced apart from said housing, the basket comprising a bowl with openings to allow water to drain from the sides and bottom of the basket upon rotation of the basket, and defining a central axis;
c) a motor effective for spinning the basket about its central axis;
d) a washable particulate material contained in the basket;
e) a water inlet effective to provide water to the interior of the basket;
f) a sensor effective to detect the presence of a pet in the basket and also effective to detect the absence of a pet in the basket.
g) a controller to receive a signal from the sensor indicating that a pet has been present in the basket and has subsequently left the basket, and subsequently to cause the motor to rotate the basket at a speed effective to cause water to be driven by centrifugal forces to the space between the inner basket and the outer housing.

A method for using the inventive device may comprise:
1) providing a pet sanitation device comprising:
a) an outer housing comprising a water-retaining sidewall connected to a water-retaining floor with a drain effective to drain water from the housing;
b) an inner basket positioned within the outer housing and spaced apart from said housing, the basket comprising a bowl with openings to allow water to drain from the sides and bottom of the basket upon rotation of the basket, and defining a central axis;
c) a motor effective for spinning the basket about its central axis;
d) a washable particulate material contained in the basket;
e) a water inlet effective to provide water to the interior of the basket;
f) a sensor effective to detect the presence of a pet in the basket and also effective to detect the absence of a pet in the basket.
g) a controller to receive a signal from the sensor indicating that a pet has been present in the basket and has subsequently left the basket, and subsequently to cause the motor to rotate the basket at a speed effective to cause water to be driven by centrifugal forces to the space between the inner basket and the outer housing;
2) allowing a pet to enter the device when the device is in its ready/non-spinning state;
3) detecting the presence of the pet in the device;
4) detecting that the pet has left the device;
5) introducing water into device and allowing the water to fill the housing to a level above the washable particulate material contained in the basket;
6) allowing the water to dissolve at least some of the waste in the basket to provide wastewater;
7) causing the basket to spin at a speed effective for centrifugal forces to cause the wastewater to leave the basket and to enter the space between the basket and the housing;
8) allowing the wastewater to drain from the housing.

In the most preferred embodiments the method additionally comprises opening a water inlet valve to allow water to flow into the basket, and subsequently opening a wastewater drain valve to allow wastewater to flow from the housing.

The device may include a scraper positioned adjacent an inner wall of the basket. If so, the spinning step of the inventive method may additionally be effective for scrapping litter and waste from the sides of the spinning basket.

DESCRIPTION OF PREFERRED EMBODIMENTS

Figure 1:
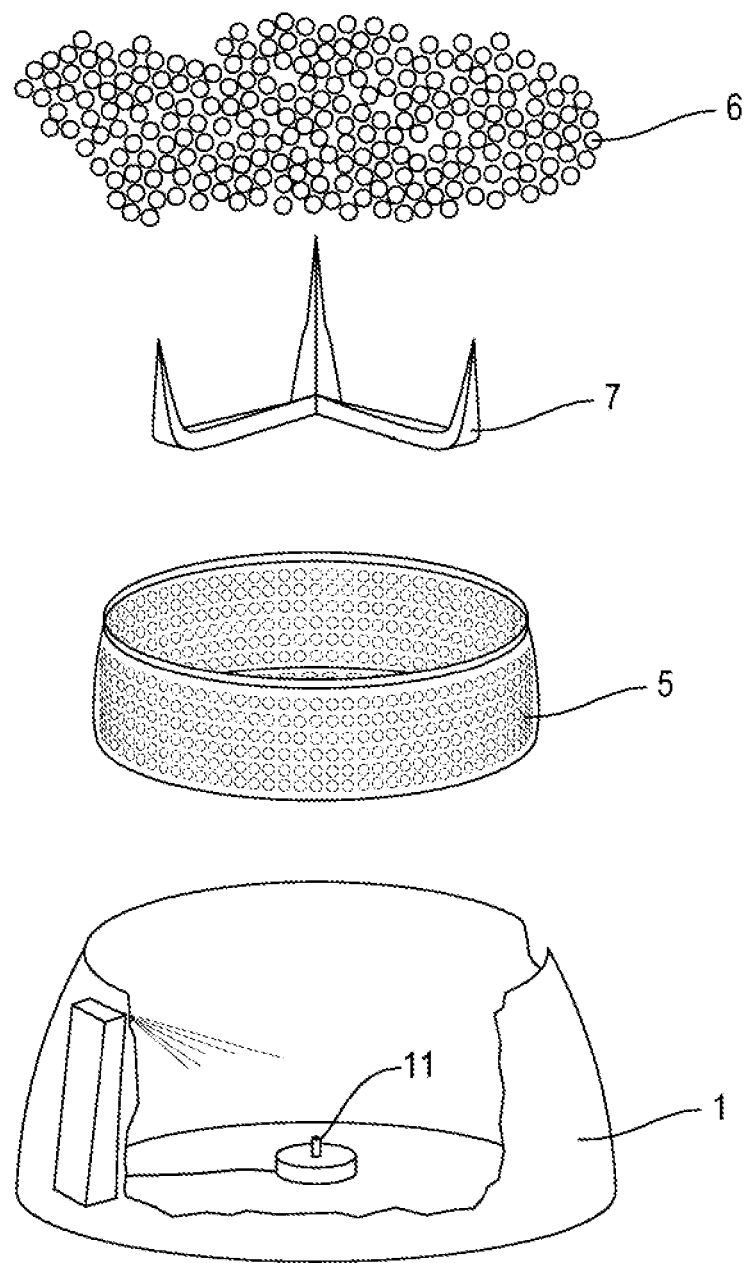
FIG. 1 shows the various primary components of the inventive pet sanitation device according to one embodiment.

For the purposes of promoting an understanding of the principles of the invention, reference will now be made to certain embodiments and specific language will be used to describe the same. It will nevertheless be understood that no limitation of the scope of the invention is thereby intended, with such alterations and modifications to the illustrated device being contemplated as would normally occur to one skilled in the art to which the invention relates.

As indicated above, one aspect of the present invention provides a pet sanitation device comprising a litter-containing basket in a housing. After a pet uses the device, the housing and basket are filled with water to begin dissolving the waste in the litter, thus producing wastewater. The basket is caused to spin about a central axis in the housing, and the spinning motion causes the litter to move within the basket. The movement of the litter in the basket agitates the solid waste material and helps to break-up the waste, making the dissolution process easier and faster. The spinning motion also produces centrifugal forces that force the wastewater outward from the basket and into the space between the basket and the housing. The wastewater is drained from the housing, leaving the device ready for a subsequent use.

In one embodiment the device may comprise:
a) an outer housing comprising a water-retaining sidewall and a water-retaining floor and a drain effective to drain water from the housing;
b) an inner basket positioned within the outer housing and spaced apart from said housing, the basket comprising a bowl with openings to allow water to drain from the sides and bottom of the basket upon rotation of the basket, and defining a central axis;
c) a motor effective for spinning the basket about its central axis;
d) a washable particulate material contained in the basket;
e) a scraper positioned adjacent an inner wall of the basket;
f) a water inlet effective to provide water to the interior of the basket;
g) a sensor effective to detect the presence of a pet in the basket and also effective to detect the absence of a pet in the basket.
h) a controller to receive a signal from the sensor indicating that a pet has been present in the basket and has subsequently left the basket, and subsequently to cause the motor to rotate the basket at a speed effective to cause water to be driven by centrifugal forces to the space between the inner basket and the outer housing.

1. The Outer Housing

The inventive device comprises an outer housing. The outer housing is open at the top and/or the side (preferably the upper portion of the side) to allow a pet to enter the device, but is otherwise generally effective for retaining water. Accordingly, the outer housing preferably comprises a water-retaining sidewall connected to a water-retaining floor. A wastewater drain is provided in the floor and is effective to drain water from the housing.

The preferred housing has a bowl shape with an inner wall that is substantially the same shape as the shape of a basket contained within. Other shapes may be used if desired.

The sidewall(s) of the outer housing extend(s) upward at least as high as the "fill" height of the litter contained in the basket in the housing. Preferably the sidewall(s) extend(s) upward for a height of about 2-10 inches above the fill height, and more preferably about 2-6 inches above the fill height. Most preferably the sidewall(s) of the outer housing extend(s) upward approximately 2-4 inches about the "fill" height of the litter in the inner basket.

The housing is effective to collect wastewater that is removed from the spinning basket within, and to direct that wastewater to a drain that allows the wastewater to be removed from the basket. Accordingly, the preferred housing has a sloped or bowl-shaped floor that directs wastewater to a drain area in the bottom or side of the housing. In some preferred embodiments the floor slopes downward toward the outside, with the center being slightly raised to facilitate draining of collected waste fluid in the area around the waste outlet drain.

The drain is effective for removing wastewater from the housing after use. In some embodiments the drain is plumbed into a wastewater line, such as a toilet waste line. The drain is preferably gravity fed, although one or more pumps may be included in the drain line before or after the drain line leaves the device. Optional filters to catch solid waste from the drain line may also be included.

The housing may also be effective for supporting one or more water inlet lines. The water inlet lines are preferably effective for providing sufficient water at sufficient pressure to fill the device in no more than several minutes.

The housing may also be effective for supporting one or more sensors that detect the presence of a pet within the housing. The sensors are effective for detecting when a pet enters and/or leaves the device, and are effective for sending a signal to a controller to initiate the cleaning action after a pet has entered and subsequently left the device.

The housing may be made of plastic or metal or another substantially rigid material.

The preferred outer housing is substantially bowl-shaped with a diameter that is preferably between about 16 inches and about 24 inches, and more preferably is about 20 inches, although larger or smaller sizes may be appropriate for some pets, including dogs as well as cats. The housing preferably has a height of about 6 inches to about 12 inches, and more preferably about 8 inches.

The housing may be associated with other features such as a ramp to facilitate entry by pets into the device. A top or cover may also be provided. The housing may also include or support a fan and/or air cleaning device.

2. The Basket

A basket is provided inside the outer housing. The basket preferably comprises a cylindrical- or bowl-shaped device with a plurality of openings. Openings are preferably provided in the basket sides and in the basket floor. The openings are sized to allow wastewater to pass from the inside of the basket while preventing the washable particulate material from passing from the basket through the sides or bottom. The basket may be made of a metal or plastic screen-type material with an opening size that is smaller than the size of the litter material.

The basket is preferably removable to allow the basket to be cleaned.

The basket openings preferably extend substantially all around the sides and bottom of the basket, although the uppermost portion of the sidewall may be solid without openings. In one embodiment the openings are provided to a height that indicates the preferred "fill" depth of litter in the basket. A short (preferably less than 4 inches), solid or perforated portion extends above the "fill" height of the basket to retain excess litter if the basket is over-filled.

The basket openings may be round or elliptical or oblong or rectangular or another shape. The openings are sized to prevent the washable particulate material from leaving the basket when the basket is spinning at a rotational speed of at least 200 rpm. The openings are also sized to allow water to be removed from the basket by the centrifugal forces that are created when the basket is spinning at a rotational speed of at least 200 rpm The basket may be made of plastic or metal or another substantially rigid material. The basket is strong enough to support the combined weight of a 15 pound pet and 5 pounds of washable particulate material when the pet is using the device.

The basket defines a central axis about which the basket can spin. The central axis is typically generally perpendicular to the bottom/floor of the basket and generally parallel to the sidewalls of the basket.

The preferred basket is substantially bowl-shaped with a diameter that is preferably slightly smaller than the housing diameter, i.e., about 14-15 inches to 22-23 inches, and more preferably is about 18-19 inches, although larger or smaller sizes may be used. The basket also preferably has a height of about 4 inches to about 10 inches, and more preferably about 6 inches.

In some embodiments the floor of the basket is slightly raised near the center and slightly lower near the outside. This facilitates the outward movement of the particulate material and helps break-up waste material.

3. The Washable Particulate Material

The washable particulate material functions as the "litter" in the device. The preferred material does not absorb or retain waste or waste odors. In some preferred embodiments the washable particulate material comprises glass, metal, or plastic beads with a diameter of about 3 mm to about 15 mm, and more preferably about 6 mm. The material may include magnetized portions to allow the litter to be attracted by and retained in or on some portion of the device or an associated component such as a walkway.

The washable particulate material (alternatively referred to herein as "litter"), may comprise a plurality of spherical pieces, or it may comprise a plurality of pieces of another shape. The pieces may have a smooth, outer surface, or they may have surface features that provide a hydrophobic surface. Generally, the particles are provided with an outer surface that does not hold or retain waste and/or odors.

The washable particulate material provides a substrate that moves within the basket during the spinning action to help break-up the solid waste and to speed the dissolution process. The washable particulate material also helps satisfy the digging and burying instinct that some pets have for their waste.

The preferred litter material is shaped as small spheres or some other regular shape with a smooth outer surface that is free from cracks or holes or crevices or other places where waste may be retained. The preferred particle size is between about 3 mm and about 15 mm, with particle sizes of about 5 mm to about 10 mm being more preferred.

The litter is provided in the basket to a depth of between about 1" and 3", with a depth of about 2" being preferred. The basket may include a "fill line" or other indicator of the appropriate fill depth for the litter.

4. The Spinning Mechanism

The device includes a spinning mechanism effective to spin the basket, and the litter contained therein, within the housing at a speed effective to produce centrifugal forces that are sufficient to move wastewater from the basket to the space between the basket and the housing.

An electric motor is preferably used to power the spinning mechanism. The motor preferably is effective to spin the filled and waste-laden basket at a speed of at least 200 rpm, and more preferably at a speed of at least 400 rpm, and most preferably at a speed of at least about 600 rpm.

The basket preferably includes or is connected to a shaft connected to the motor. The shaft defines the axis of rotation of the basket. When the motor turns the shaft, the basket spins about the central axis.

5. The Basket Scrapers

The device optionally includes one or more scrapers effective to prevent litter from clumping against the basket floor and/or sidewalls while the basket is spinning. The scraper(s) are preferably spaced a short distance, e.g., ⅛ inch to ½ inch, from the inside of the basket. The scrapers preferably do not spin when the basket is spinning, and remain in place to "scrape" litter from the basket bottom/ walls when the basket is spinning.

The scraper(s) may be positioned adjacent the basket bottom, and may additionally or alternatively extend up the basket sides for at least the height of the litter fill.

The scrapers may be fixed in one position, or may spin in relation to the basket.

6. Water Flow

A water inlet and a wastewater drain/outlet are preferably provided. The water inlet provides water to the interior of the basket and the wastewater outlet drains water from the interior of the housing.

The water inlet may provide water to multiple areas of the basket to facilitate fast filling and to "wash" multiple areas of the basket simultaneously. The water may be provided as a stream or a spray.

The wastewater drain allows wastewater to flow from the inside of the housing when the wastewater drain is open. When the wastewater drain is closed the water will fill the housing and basket to a level at or somewhat above the upper surface of the litter.

On some embodiments the device is plumbed into existing water/sewer lines like a toilet is. The device may be plumbed into existing toilet plumbing so that water goes into the device and drains into a toilet bowl.

A cleaning solution/disinfectant may be added to the water line. A cartridge containing the cleaning/disinfecting solution may be added to the water inlet line to dispense cleaner/disinfectant into the water.

7. Use of the Device

In operation, the device begins in a non-spinning state with the waste valve closed and no water in the device. A pet enters the device and the sensor detects the presence of the pet. The pet goes to the bathroom in the litter and leaves the device. The sensor detects that the pet has left the device, and water is then introduced into the device and is allowed to rise to a level above the level of the litter.

As water fills the basket and the bowl, the solid waste in the basket is dissolved into the water but is not absorbed by the litter. The waste and dissolved solids are removed from the basket by causing the basket to spin around a central axis at a speed sufficient to cause centrifugal forces to force the water and dissolved waste from the basket and into the bowl. The waste valve is opened and the waste water is removed from the device. The basket may begin spinning at essentially any stage in the process after the pet has left the device, including before water is introduced into the basket.

8. Discussion of the Drawings

Referring now to the drawings, the inventive device comprises a housing that is preferably shaped as a bowl (1) and is provided with a water inlet (2) and a wastewater drain (3). One or more valves (4) control the flow of water into and out of the bowl.

Basket (5) is contained in the bowl and is spaced apart from the bowl. A non-absorbable litter material (6) is contained in the basket. The basket has openings configured to retain the non-absorbable litter material in the basket while still allowing water to drain from the sides and bottom of the basket.

A motor (not shown) is provided to spin the basket within the bowl at a speed effective to create centrifugal forces effective to force liquid from the non-absorbable litter to the space between the basket and the bowl. The wastewater then collects at the bottom of the bowel and is drained from the bowl through the wastewater drain.

One or more structures such as ribs (7) may be provided to agitate the spinning litter and waste to facilitate the waste dissolution process. Such structures may also or alternatively be scrapers that scrape litter from the inside of the basket so that the litter is agitated to facilitate the waste removal process.

One or more sensors (9) may be provided to detect the presence of a pet in the device. The sensors detect when a pet has entered the device and may also detect when the pet has left the device.

In operation, the device begins in a non-use state with the waste valve closed and no water in the device. A pet enters the device and the sensor detects the presence of the pet. The pet goes to the bathroom in the litter and leaves the device. The sensor detects that the pet has left the device, and water in then introduced into the device and is allowed to rise to a level above the level of the litter.

As water fills the basket and the bowl, the solid waste in the basket is dissolved into the water but is not absorbed by the litter. The waste and dissolved solids are removed from the basket by causing the basket to spin around a central axis at a speed sufficient to cause centrifugal forces to force the water and dissolved waste from the basket and into the bowl. The waste valve is opened and the waste water is removed from the device. The basket may begin spinning at essentially any stage in the process after the pet has left the device, including before water is introduced into the basket.

Agitation of the litter and the waste in the basket is optionally provided. For example, stationary or movable ribs or arms may scrape down the sides of the spinning basket to agitate the spinning litter and waste and to facilitate the waste dissolution process.

Figure 2:
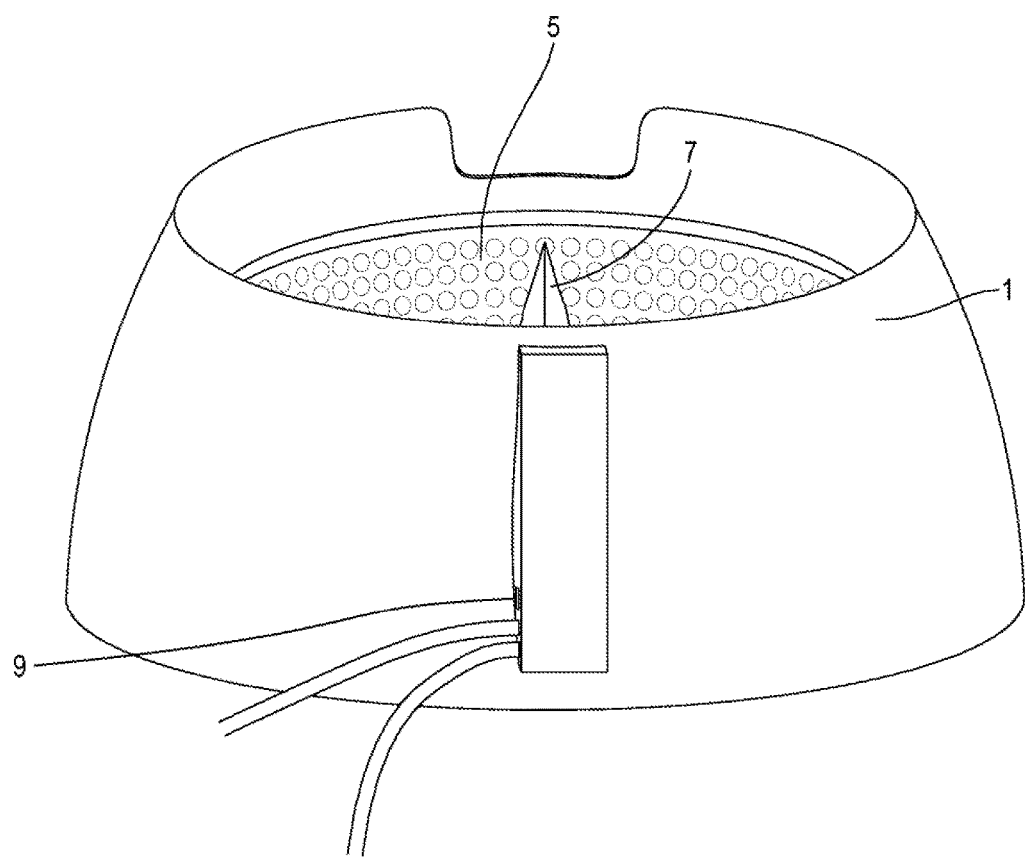
FIG. 2 is a perspective view of the inventive pet sanitation device according to one embodiment.
Figure 3:
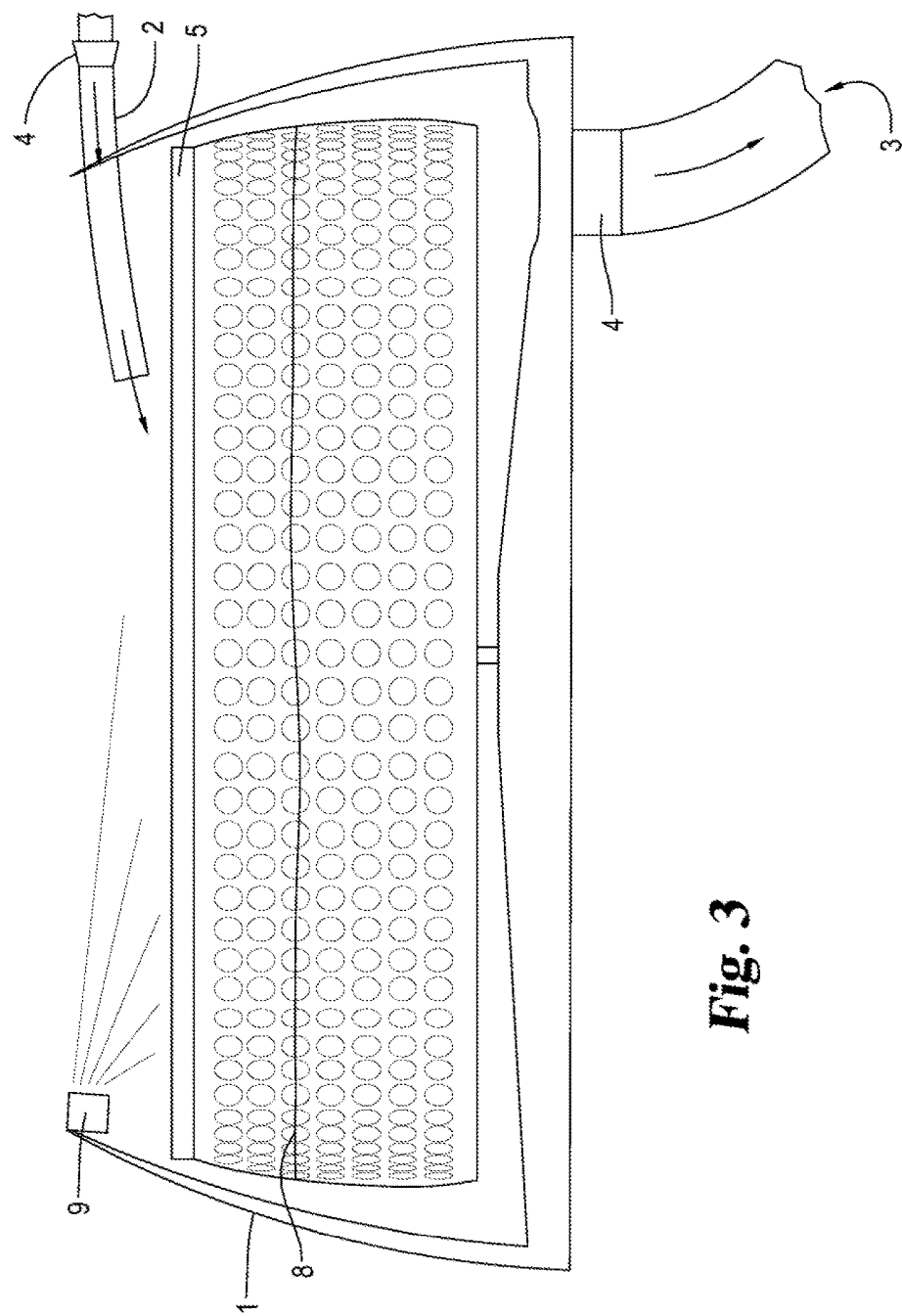
FIG. 3 is a side elevation view, in section, of the inventive pet sanitation device according to one embodiment.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. In addition, it is to be appreciated that the present invention may comprise or consist essentially of any or all of the illustrated or described devices. For example, the present invention includes devices comprising each of the embodiments illustrated in FIGS. 1 through 3, and the present invention includes devices consisting essentially of any of the embodiments illustrated in FIGS. 1 through 3. Additionally, any or all of the features and/or embodiments disclosed herein may be combined with any or all of the other features and/or embodiments disclosed herein to provide a device that comprises or consists essentially of such features.

The invention claimed is:

1. A pet sanitation device comprising:
   a) a housing comprising a water-retaining sidewall and a water-retaining floor with a drain effective to drain water from the housing;
   b) a basket positioned within the housing and spaced apart from said housing, the basket comprising sides and a bottom, with openings to allow water to drain from the sides and bottom of the basket upon rotation of the basket, and defining a vertical axis;
   c) a motor effective for spinning the basket about its vertical axis;
   d) a washable particulate material contained in the basket;
   e) a scraper positioned adjacent an inner wall of the basket and effective to prevent said washable particulate material from clumping against the inside of the basket bottom and/or the inside of the basket sides while the basket is spinning, wherein said housing is open at a top while the basket is spinning;
   f) a water inlet effective to provide water inside the basket
   g) a sensor effective to detect the presence of a pet in the basket and also effective to detect the absence of a pet in the basket;
   h) a controller to receive a signal from the sensor indicating that a pet has been present in the basket and has subsequently left the basket, and subsequently to cause the motor to rotate the basket at a speed effective to cause water to be driven by centrifugal forces to the space between the basket and the housing.

2. The device of claim 1 wherein said motor is effective for spinning the basket about its vertical axis at a speed of at least 200 rotations per minute.

3. The device of claim 1 wherein said scraper is fixedly positioned inside the basket a distance of 1/8" to 1/2" from the inner wall of the basket.

4. A pet sanitation device comprising:
   a) a housing comprising a water-retaining sidewall and a water-retaining floor with a drain effective to drain water from the housing;
   b) a basket positioned within the housing and spaced apart from said housing, the basket comprising sides and a bottom, with openings to allow water to drain from the sides and bottom of the basket upon rotation of the basket, and defining a vertical axis;
   c) a washable particulate material contained in the basket;
   d) a motor effective for spinning the basket and washable particulate material about said vertical axis at a speed effective to produce centrifugal forces that are sufficient to move wastewater from the basket top the space between the basket and the housing, wherein said housing is open at a top while the basket is spinning;
   e) a water inlet effective to provide water inside the basket;
   f) a drain effective to drain water from the housing; and
   g) a scraper positioned adjacent an inner wall of the basket and effective to prevent said washable particulate material from clumping against the inside of the basket bottom and/or the inside of the basket sides while the basket is spinning.

5. The pet sanitation device according to claim 4, and further comprising a sensor effective to detect the presence of a pet in the basket and also effective to detect the absence of a pet in the basket, and a controller to receive a signal from the sensor indicating that a pet has been present in the basket and has subsequently left the basket, and subsequently to cause the motor to rotate the basket at a speed effective to cause water to be driven by centrifugal forces to the space between the basket and the housing.

* * * * *